(12) United States Patent
Green

(10) Patent No.: US 8,464,836 B2
(45) Date of Patent: Jun. 18, 2013

(54) LUBRICATION APPLICATOR FOR CAN PROCESSING MACHINE

(75) Inventor: Dennis Green, Lynchburg, VA (US)

(73) Assignee: Belvac Production Machinery, Inc., Lynchburg, VA (US)

( * ) Notice: Subject to any disclaimer, the term of this patent is extended or adjusted under 35 U.S.C. 154(b) by 335 days.

(21) Appl. No.: 12/710,808

(22) Filed: Feb. 23, 2010

(65) Prior Publication Data
US 2010/0213030 A1 Aug. 26, 2010

Related U.S. Application Data

(60) Provisional application No. 61/202,427, filed on Feb. 26, 2009.

(51) Int. Cl.
*B65G 45/02* (2006.01)
(52) U.S. Cl.
USPC .......................................................... 184/16
(58) Field of Classification Search
USPC ........... 184/16; 72/41, 42, 43, 44, 94, 405.03, 72/379.4, 419–426; 413/29, 69–77
See application file for complete search history.

(56) References Cited

U.S. PATENT DOCUMENTS

| | | | |
|---|---|---|---|
| 1,673,236 A | 6/1928 | Fleisher | |
| 3,378,285 A | 4/1968 | Staley | |
| 3,418,837 A | 12/1968 | Vanderlaan, et al. | |
| 3,581,542 A | 6/1971 | Wahler et al. | |
| 3,797,429 A | 3/1974 | Wolfe | |
| 3,983,729 A | 10/1976 | Traczyk et al. | |
| 4,278,711 A | 7/1981 | Sullivan | |
| 4,402,202 A | 9/1983 | Gombas | |
| 4,446,714 A * | 5/1984 | Cvacho | 72/370.02 |
| 4,513,595 A * | 4/1985 | Cvacho | 72/43 |
| 4,519,232 A | 5/1985 | Traczyk et al. | |
| 4,547,645 A | 10/1985 | Smith | |
| 4,671,093 A | 6/1987 | Dominico et al. | |
| 4,697,414 A * | 10/1987 | McCarty | 60/39.08 |

(Continued)

FOREIGN PATENT DOCUMENTS

| | | |
|---|---|---|
| DE | 37 05 878 A1 | 9/1987 |
| DE | 39 08 394 C1 | 12/1989 |

(Continued)

OTHER PUBLICATIONS

U.S. Appl. No. 11/581,787, filed Oct. 17, 2006, Marshall.

(Continued)

*Primary Examiner* — William E Dondero
*Assistant Examiner* — Mark K Buse
(74) *Attorney, Agent, or Firm* — Nixon Peabody LLP

(57) ABSTRACT

A lubricating mechanism for a machine arrangement includes a lubricating track. The lubricating track may be connected to or part of an infeed mechanism of the machine arrangement, or may be connected to or adjacent a star wheel. The infeed mechanism is configured to supply articles to be processed to the machine arrangement. The lubricating track includes an outer guide member configured to contact articles adjacent open ends of the articles. The lubricating track also includes at least one opening in the outer guide member for passage of lubricant from the outer guide member to a lubrication path. The lubrication path is configured to be in contact with the articles in the track in order to apply the lubricant to the articles.

26 Claims, 20 Drawing Sheets

U.S. PATENT DOCUMENTS

| | | | |
|---|---|---|---|
| 4,774,839 A | 10/1988 | Caleffi et al. | |
| 4,808,053 A | 2/1989 | Nagai et al. | |
| 4,824,303 A | 4/1989 | Dinger | |
| H906 H | 4/1991 | Baggett et al. | |
| 5,209,101 A | 5/1993 | Finzer | |
| 5,220,993 A | 6/1993 | Scarpa et al. | |
| 5,242,497 A | 9/1993 | Miller et al. | |
| 5,249,449 A | 10/1993 | Lee et al. | |
| 5,282,375 A | 2/1994 | Lee et al. | |
| 5,344,252 A | 9/1994 | Kakimoto | |
| 5,497,900 A | 3/1996 | Caleffi et al. | |
| 5,555,756 A * | 9/1996 | Fischer et al. | 72/41 |
| 5,590,558 A * | 1/1997 | Saunders et al. | 72/347 |
| 5,611,231 A | 3/1997 | Marritt et al. | |
| 5,676,006 A | 10/1997 | Marshall | |
| 5,718,030 A | 2/1998 | Langmack | |
| 5,755,130 A | 5/1998 | Tung et al. | |
| 5,771,807 A | 6/1998 | Moss | |
| 5,832,769 A | 11/1998 | Schultz | |
| 6,220,138 B1 | 4/2001 | Sakamoto | |
| 6,622,379 B1 | 9/2003 | Kano | |
| 6,637,247 B2 | 10/2003 | Bowlin | |
| 6,874,971 B2 | 4/2005 | Albaugh | |
| 7,219,790 B2 | 5/2007 | Lanfranchi | |
| 7,263,867 B2 | 9/2007 | Bartosch et al. | |
| 7,310,983 B2 | 12/2007 | Schill et al. | |
| 7,387,007 B2 * | 6/2008 | Schill et al. | 72/94 |
| 7,404,309 B2 | 7/2008 | Schill et al. | |
| 7,409,845 B2 * | 8/2008 | Schill et al. | 72/379.4 |
| 7,418,852 B2 | 9/2008 | Schill et al. | |
| 7,454,944 B2 * | 11/2008 | Schill et al. | 72/481.6 |
| 7,464,573 B2 | 12/2008 | Shortridge | |
| 7,530,445 B2 | 5/2009 | Marshall et al. | |
| 7,568,573 B2 | 8/2009 | Schill | |
| 7,805,970 B2 * | 10/2010 | Woulds | 72/349 |
| 2003/0063949 A1 | 4/2003 | Hohenocker | |
| 2006/0101885 A1 | 5/2006 | Schill et al. | |
| 2006/0101889 A1 | 5/2006 | Schill et al. | |
| 2007/0227859 A1 | 10/2007 | Marshall et al. | |
| 2010/0212130 A1 | 8/2010 | Marshall | |
| 2010/0212385 A1 | 8/2010 | Marshall | |
| 2010/0212390 A1 | 8/2010 | Marshall et al. | |
| 2010/0212394 A1 * | 8/2010 | Babbitt et al. | 72/426 |
| 2010/0213677 A1 | 8/2010 | Marshall | |
| 2011/0108389 A1 | 5/2011 | Bonnain | |

FOREIGN PATENT DOCUMENTS

| | | |
|---|---|---|
| DE | 40 23 771 | 1/1992 |
| DE | 103 19 302 B3 | 8/2004 |
| EP | 0 384 427 A1 | 8/1990 |
| EP | 1 215 430 A1 | 6/2002 |
| EP | 1 714 939 A1 | 10/2006 |
| GB | 0 235 28 | 12/1910 |
| GB | 1 042 506 | 9/1966 |
| JP | 05-038476 A | 2/1993 |
| JP | 2002-310178 | 10/2002 |
| WO | WO-88/05700 A1 | 8/1988 |
| WO | WO-90/11839 | 10/1990 |
| WO | WO-96/33032 | 10/1996 |
| WO | WO-97/37786 | 10/1997 |
| WO | WO-98/19807 A1 | 5/1998 |
| WO | WO-01/90591 A1 | 10/2002 |
| WO | WO-2006/055185 A1 | 5/2006 |
| WO | WO-2010/099067 A1 | 9/2010 |
| WO | WO-2010/099069 A1 | 9/2010 |
| WO | WO-2010/099081 A1 | 9/2010 |
| WO | WO-2010/099082 A1 | 9/2010 |
| WO | WO-2010/099165 A2 | 9/2010 |
| WO | WO-2010/099171 A1 | 9/2010 |

OTHER PUBLICATIONS

U.S. Appl. No. 11/692,564, filed Mar. 28, 2007, Marshall.
U.S. Appl. No. 11/692,584, filed Mar. 28, 2007, Schill.
International Search Report for PCT Application No. PCT/US2010/024926 dated May 27, 2010.
International Search Report for PCT Application No. PCT/US2010/024941 dated Jun. 23, 2010.
International Search Report for PCT Application No. PCT/US2010/024988 dated Jun. 14, 2010.
International Search Report for PCT Application No. PCT/US2010/024992 dated Jun. 2, 2010.
International Search Report for PCT Application No. PCT/US2010/025192 dated Jun. 18, 2010.
Partial Search Report for PCT Application No. PCT/US2010/025182 dated Jul. 14, 2010.
PCT International Search Report and the Written Opinion on application No. PCT/US2010/025182 dated Sep. 28, 2010; 17 pages.
American National Can; Drawings showing commercially available 5811-12 necker machine and Parts List; Oct. 1993; 4 pages.
American National Can; Extracts from brochure: 5811/5811-2 Necker Flanger Reformer—Periodic Inspection and Maintenance Procedures; Apr. 22, 1994; 9 pages.
American National Can; Extracts from brochure: ANC Necker Secrets Revealed; 1996; 3 pages.
American National Can; Invoice to Hanil Can Co., Ltd dated Feb. 2, 1998; 1 page.
Notice of Opposition mailed May 12, 2010, to European Application No. 05817255.2; Patent No. 1824622.
USPTO Action on U.S. Appl. No. 12/501,135 mailed Nov. 8, 2011; 16 pages.

* cited by examiner

LUBRICATION APPLICATOR FOR CAN PROCESSING MACHINE

CROSS-REFERENCE TO RELATED PATENT APPLICATION

This application is an application claiming the benefit under 35 U.S.C. §119(e) of U.S. Provisional Patent Application No. 61/202,427 filed Feb. 26, 2009, which is incorporated by reference herein in its entirety.

BACKGROUND

The present invention relates generally to the field of forming or processing an article, such as a beverage container or can. More specifically, the invention relates to the processing machine (such as a necking machine) and machine arrangement and components.

During the processing of a can in a machine or machine arrangement, the can should be sufficiently lubricated to permit easy passage through the machine arrangement. Conventional lubrication mechanisms tend to be complex and messy. Prior art lubrication mechanisms utilized a vacuum star wheel equipped with lubricating rollers, which are complex and costly. Other conventional lubricating mechanisms utilize a wick that directly contacts a can, which can cause debris to build up on the wick requiring the wick to be replaced during the life of the machine arrangement.

SUMMARY

One exemplary embodiment provides a lubricating mechanism for a machine arrangement. The lubricating mechanism comprises a lubricating track connected to or part of an infeed mechanism of the machine arrangement. The infeed mechanism is configured to supply articles to be processed to the machine arrangement. The lubricating track includes an outer guide member configured to contact articles adjacent an open end of each of the articles. The outer guide member comprises a lubricant passage or chamber. The lubricating track further includes at least one opening in the outer guide member for passage of lubricant from the outer guide member to a lubrication path configured to be in contact with the articles in the lubricating track to apply the lubricant to the articles. The lubricating track is curved such that the articles roll through the track as the lubricant is being applied.

Another exemplary embodiment provides a machine arrangement with a lubricating mechanism. The machine arrangement comprises an article infeed mechanism with a lubricating track. The article infeed mechanism is configured to supply articles to be processed to machines in the machine arrangement. The lubricating track includes inner and outer guide members configured such that an open end of each of the articles in the lubricating track are positioned between the inner and outer guide members. The lubricating track further includes a lubrication path on the outer guide member extending for at least a portion of a length of the lubricating track. The articles contact lubricant in the lubrication path when rolling through the track without contacting a wick.

Yet another exemplary embodiment provides a method of lubricating an article in a machine arrangement. The method comprises providing a curved lubricating track, applying a lubricant to a lubrication path on the lubricating track from a lubricant chamber, and rolling at least one article along the curved lubricating track so that lubricant transfers to an open end of each of the at least one article as the at least one article contacts the lubrication path on the lubricating track.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

The Figures illustrate a lubrication mechanism for article processing machines and machine arrangements (or machine lines) and related components. The article processing machine may process articles to perform a necking operation, or any other suitable operation (such as curling, flanging, etc.). An article may be a can, any suitable food or beverage container, jar, bottle or any other suitable article. The description below uses article and can interchangeably. The can has an open end, an opposite closed end, and a sidewall extending from the closed end. Alternatively, the can may be open at both ends. A top, lid or other closure may be added to the can after the forming process(es).

For exemplary purposes only, the below description will describe the mechanisms and methods for use on a can. It will be recognized that any other type of article (such as that described above) may be used.

Reference will now be made to the FIGURES.

Figure 10:
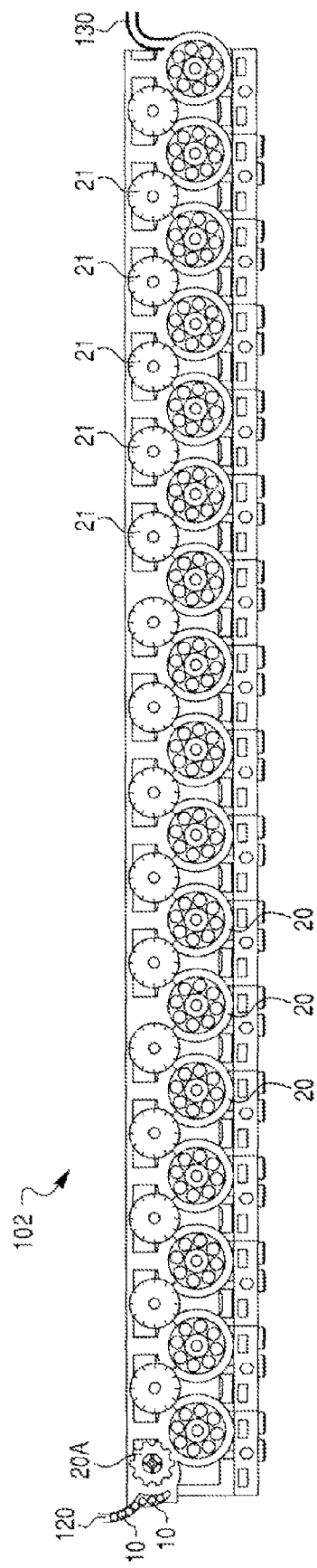
FIG. 10 illustrates an exemplary embodiment of a machine line with a can infeed.

Cans 10 are fed into a continuously rotating infeed star wheel 20A (either from an infeed track, infeed lubricating mechanism track 100, or from a preceding transfer star wheel 20, which may be part of a machine line 102. As shown in exemplary FIG. 10, an infeed star wheel 20A is configured to pass a can 10 to a continuously rotating transfer star wheel 20, which is configured to then pass the can 10 to an adjacent turret star wheel 21 or a turret or forming machine 22 in the machine line 102. While the can 10 is in the turret star wheel 21, a forming (necking, flanging, etc.) operation is performed on the can 10. While the turret star wheel 21 is rotating with the can 10, the can 10 is then transferred from the forming turret star wheel 21 onto another transfer star wheel 20, forming/process turret star wheel 21, or a discharge track 130. In order to suitably lubricate an outside surface of an open end 12 (see FIG. 4) portion of the can 10, a lubrication mechanism is utilized in the machine line. The machine line 102 shown is exemplary only. Any other suitable machine line configuration may be utilized.

In an embodiment, the cans 10 are held in position on this infeed transfer star wheel 20A (and other star wheels or turrets) using a pneumatic pressure differential or "suction" as it will be referred to. The transfer star wheels 20 are arranged to hold the cans 10 in position using suction applied to the outside surface of the can 10 through a vacuum opening 24 in pockets 22, such as may be seen in FIG. 3. The transfer star wheels 20, 20A can have any number of suitable pockets 22 for holding the cans 10. For example, the transfer star wheels 20, 20A can each have twenty pockets 22. The number of pockets 22 in the transfer star wheels 20, 20A can vary as appropriate.

According to an embodiment, a lubricating mechanism 100 is provided, and shown best in FIGS. 1-8. The lubricating mechanism 100 is configured to be used in die necking processes, or other suitable applications. The lubricating mechanism applies lubricant via a lubricant flow path 115 (see FIG. 3, for example) on an outer guide member 210 (sometimes referred to as a rail) that will reduce and contain mess generated by the lubrication process. The lubricating mechanism 100 may be part of, before, or after the can infeed 120.

The lubricating mechanism 100 includes a curved track 110 (see FIG. 5, for example) that is either before or after the infeed mechanism, or is integrated into the infeed mechanism of the can processing machine line (such as for die necking). The curved track 110 of the lubricating mechanism 100 is configured to cause the cans 10 to roll primarily rather than slide through the section of track 110 where the lubricant is to be applied. The radius or curvature of the track 110 is configured to encourage rolling in the normal range of operating speeds of machine lines.

According to an exemplary embodiment, the flow of cans 10 leading into the track 110 may be controlled by a control mechanism (not shown). If the cans 10 experience significant loading in the track 110 (such as from the cans 10 being too closely spaced), the friction between the cans 10 may stop or prevent rotation of the cans 10. The control mechanism may include, as an example, a star wheel 20 arranged before the track 110 and configured to feed cans 10 into the lubrication track 110 to space out and control the flow of cans 10 into the track. Any other suitable control mechanism may be utilized.

The length of the track 110 is such that the can 10 is able to rotate or roll a full revolution of the can 10 in order to apply the lubricant. For example, the length of the track 110 is approximately at least two times the circumference of a can 10. Alternatively, the length of the track 110 may be shorter or longer. For example, the length of the track 110 may be less than a circumference of a can 10.

The lubricating mechanism 100 includes first 200 and second 300 frame members (sometimes referred to as guide mounting plates) forming the track 110. On the first frame member 200, the outer guide member 210, an inner guide member 270, and a guide/wear plate 230 are attached.

Figure 6:
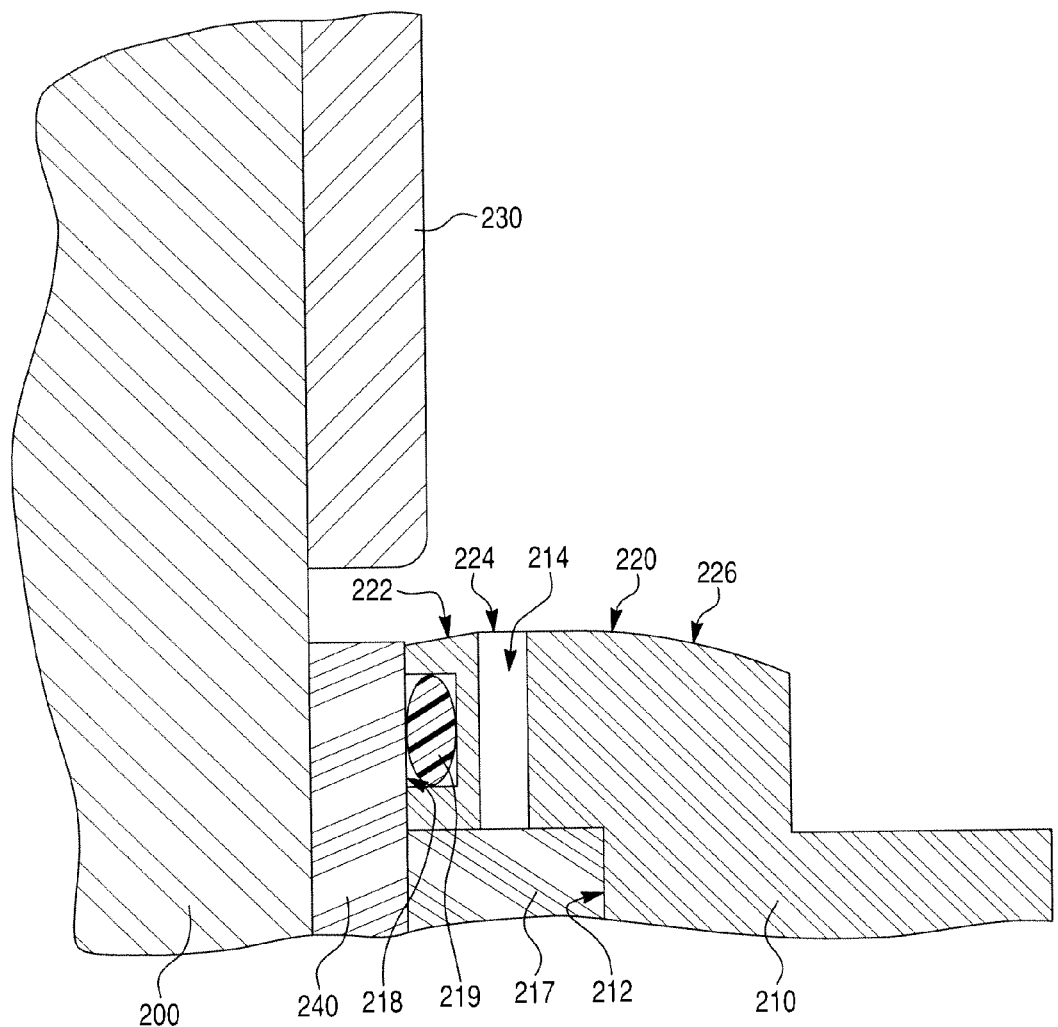
FIG. 6 is a detail view of an outer guide contacting surface of the lubrication mechanism.
Figure 7:
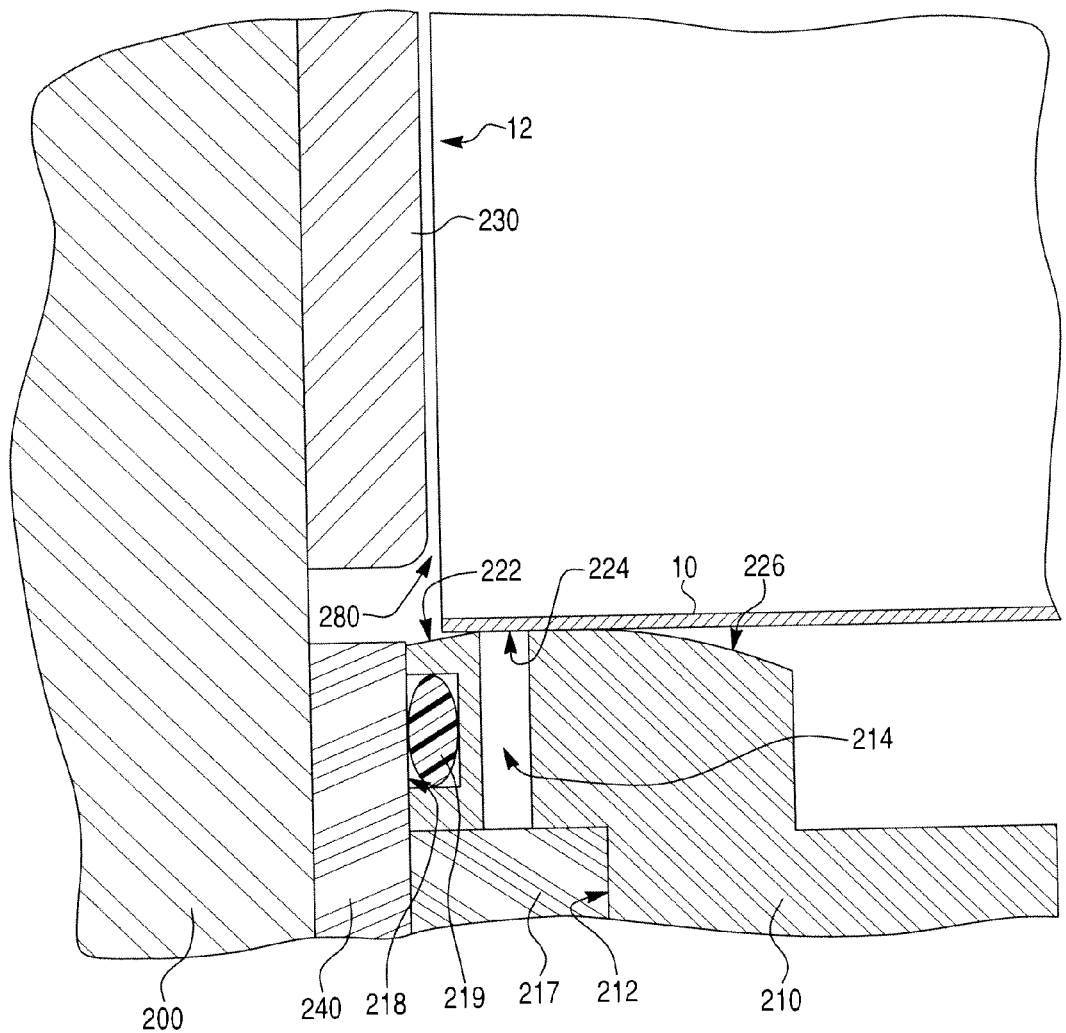
FIG. 7 is a detail view of the outer guide contacting surface of FIG. 6 in which a can is shown contacting the outer guide contacting surface.

The outer guide member 210 is positioned on an outer radius portion of the curved track 110 that includes a narrow contacting surface 220 (sometimes referred to as a narrow width) for contacting cans 10 near their open end 12. In other words, the width of the outer guide member 210 is sufficiently narrow so that only a minimum required amount of the open end 12 of the can 10 will contact the outer guide member 210 and, thus, the lubricant flow path 115, as can be seen in FIGS. 6 and 7.

The outer guide member 210 includes one or more holes or passageways 214 to transport lubricant from a lubricant chamber 212 to the narrow contacting surface 220, which is in contact with cans 10 near the open end 12 of the cans 10 being conveyed along the track 110. The lubricant is configured to flow or slide down the outer guide member's 210 flow path 115 without being sprayed into the air. Excess lubricant may be directed into a container (not shown) at a bottom of the lubricating mechanism 100. The container may be any container suitable to collect excess lubricant.

The inner guide member is attached to the first frame member and spaced apart from the outer guide member. The inner guide member is separated from the outer guide member a suitable distance to permit the diameter of the cans to be positioned therebetween (and therefore, in the track).

Figure 4:
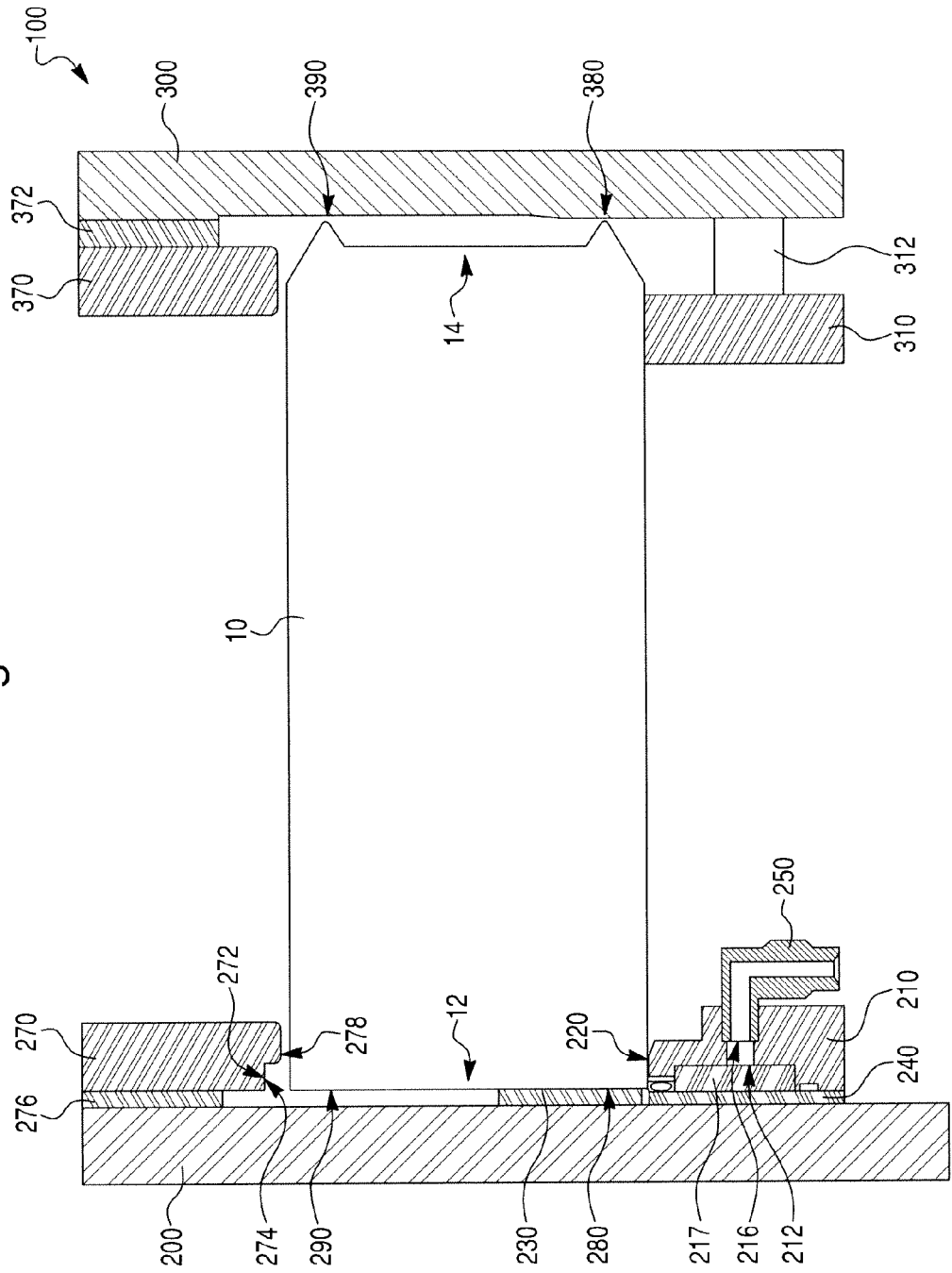
FIG. 4 is a cross-sectional view of the lubrication mechanism and infeed track.

As can be seen in FIG. 4, the inner guide member 270 includes a profile surface 272 that has a cutout portion 274 and an outermost portion 278. The cutout portion 274 is positioned on a portion of the profile surface 272 closest to the first frame member 200. The cutout portion 274 is set back from the outermost portion 278 of the profile surface 272 so the lubricant will not wipe off the can 10 when the can 10 rolls by. The outermost portion 278 of the profile surface 272 may or may not contact the surface of the can 10 as the can 10 rolls through the track 110.

As best shown in FIG. 7, a guide/wear plate 230 is positioned adjacent the outer guide member 210 such that there is a small gap 280 between the end of the can 10 (at the open end 12) and the track 110 (at the guide/wear plate 230). A larger gap 290, shown in FIG. 4, is provided between the end of the can 10 (at the open end 12) and the first frame member 200. The guide/wear plate 230 is configured to help provide the gap 280 so there is no contact between the can 10 and remaining part of the track 110 where the track 110 would provide more resistance to rolling.

A spacer 276, shown in FIG. 4, may be provided between the inner guide member 270 and the first frame member 200 to position the inner guide member 270 as needed or to use an inner guide member 270 without a cutout portion 274. Additionally or alternatively, a spacer 240 (or thermal insulator)

may be positioned between the outer guide member 210 and the first frame member 200 to position the outer guide member 210 as needed (depending on, for example, the size of the can 10), such as shown in FIGS. 4 and 7. The spacers 276, 240, along with other components, may be switched with different spacers of varying thickness to accommodate cans 10 of varying height or to apply lubricant in varying locations from the end of the can 10.

The second frame member 300 includes an outer guide rail 310 and inner guide rail 370, as best shown in FIG. 4. Spacers may be provided adjacent to the second frame member 300 to adjust for varying heights and profile shapes of the cans 10. A spacer 312 may be positioned between the second frame member 300 and the outer guide rail 310. A spacer 372 may be positioned between the second frame member 300 and the inner guide rail 370. The frame member 300 has a profile shape such that a larger gap 390 is near the inner guide rail 370 and a smaller gap 380 is near the outer guide rail 310.

Figure 5:
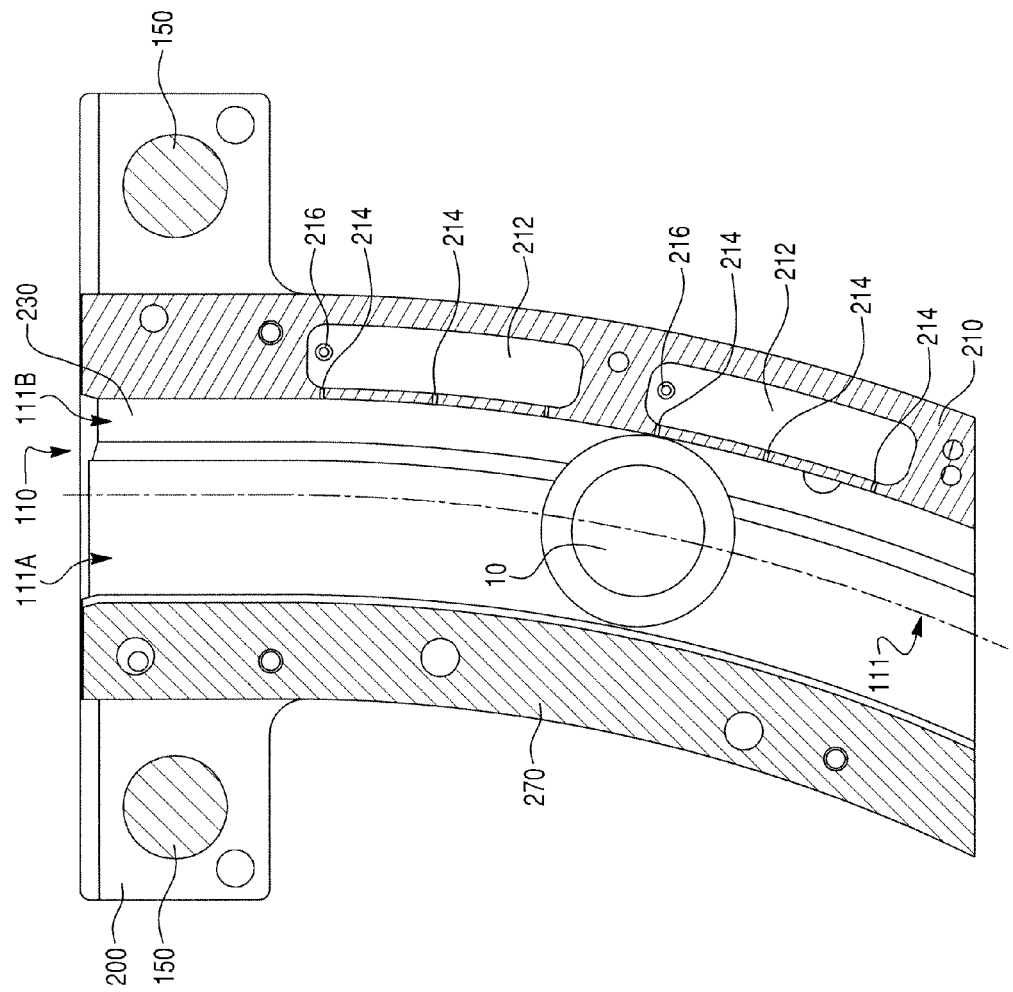
FIG. 5 is a detail view of a guide mounting plate of the infeed track.

As shown in FIGS. 4-5, the axial location of the can 10 may be positioned (via the spacers 240, 276, 312, 372 and outer and inner guide members 210, 270 and outer and inner rails 310, 370) to avoid any contact of the open end 12 of the can 10 near the inner radius (inside) portion 111A of the curved track 110 to better promote rolling of the cans 10 rather than sliding. In other words, a small gap 280 at the end of the can 10 on the outside portion 111B of the curve's centerline 111, and a larger gap 290 at the inside portion 111A of the curve's centerline 111, such as shown in FIGS. 4 and 7. The cutout surface 274 of the inner guide member 270 on the inner radius 111A of the track 110 does not touch the cans 10 where lubricant is applied due to position and/or shape of the inner guide member 270.

Figure 1:
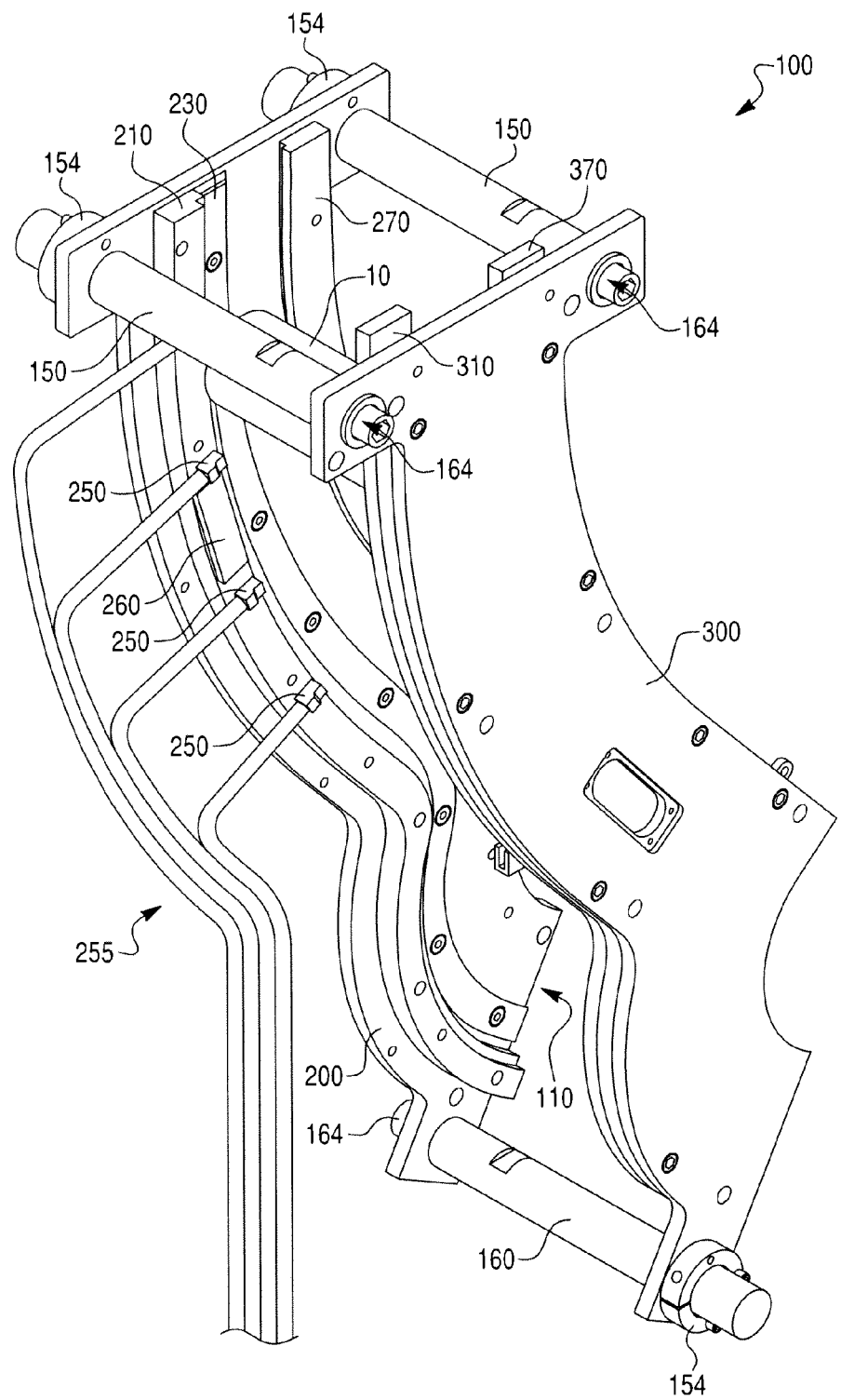
FIG. 1 is a rear perspective view of a lubrication mechanism and infeed track in which a heater is shown.
Figure 2:
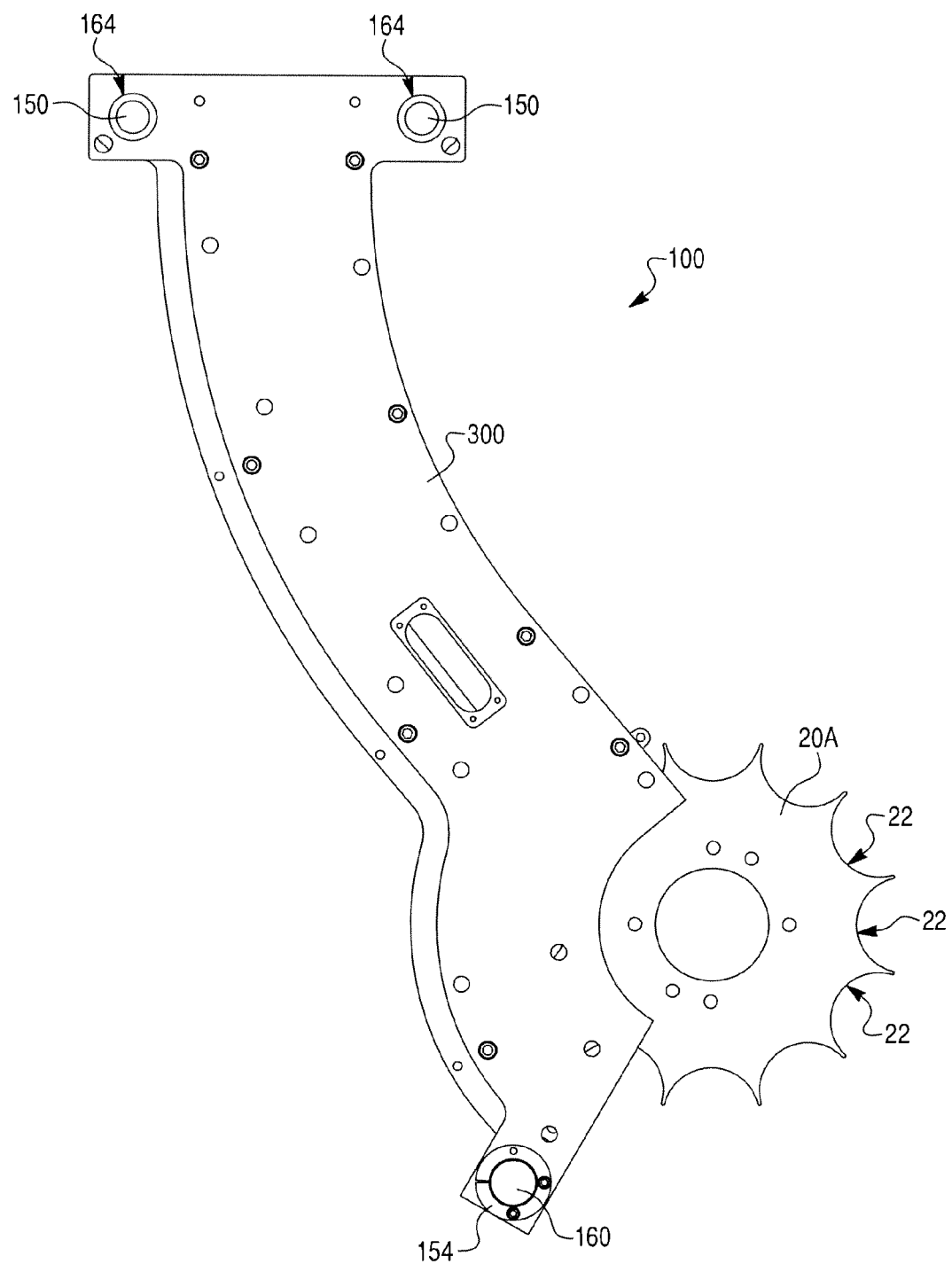
FIG. 2 is a side view of the infeed track and a transfer star wheel.

In the lubricating mechanism 100, lubricant is supplied to the track 110 via fittings 250 connected to the outer guide member 210 (FIGS. 1 and 4). A tube or hose 255 (or another suitable device) connects a lubricant chamber (not shown) or supply to the fittings 250 (FIG. 1). The lubricant flows through the fittings 250, into a path in the outer guide member 210 and into the chamber 212 (which may include the wick 217), best shown in FIG. 4. The lubricant is then configured to flow out of the openings or passageways 214 out of the outer guide member 210 to flow down the track 110 along the outside surface 220 of the outer guide member 210 in a lubricant flow path 115 to lubricate the can 10 near the open end 12 of the can 10.

The lubricating mechanism 100 includes a plurality of chambers 212 along the length of the track 110. Each chamber 212 is provided with one or more holes (or passageways) 214 that link the chamber 212 to the outside of the outer guide member 210 to allow the lubricant to flow in the flow path 115. The chamber 212 may include one or more fitting openings 216 to connect the fitting 250 to the chamber 212.

The lubricating mechanism 100 may optionally include a wick 217 positioned in the lubrication chamber 212, such as shown in FIG. 4. The wick 217 is configured to slow the flow of lubricant from the chamber 212 to the passageway 214 and contacting surface 220. The wick 217 may comprise felt or any other suitable material. The wick 217 is positioned in the lubrication chamber 212 such that the wick 217 does not directly contact the can 10, which minimizes potential debris build up on the wick 217 and reduces the need to replace the wick 217.

As shown in FIG. 1, the lubricating mechanism 100 may also include a heater 260 to heat up and, thus, liquefy or reduce the viscosity of the lubricant. The heater 260 may be attached directly onto the outer guide member 210. The heater 260 may be attached to the outer guide member 210 via an adhesive, or any other suitable alternative.

The lubricating mechanism 100 may also include a thermal insulator 240 configured to reduce heat transfer from a heated outer guide member 210 to adjacent parts, such as the first 200 and second frame members 300. The thermal insulator 240 is best shown in FIG. 4. The thermal insulator 240 comprises a plastic composite, or any other suitable material. The thermal insulator 240 may be utilized as a spacer to accommodate for varying sizes of cans 10 in the track 110.

The outer guide member 210 may further include a cavity 218 with an o-ring 219, such as shown in FIGS. 6 and 7. The o-ring 219 is configured to provide a seal such that lubricant does not leak out of the chamber 212.

Figure 3:
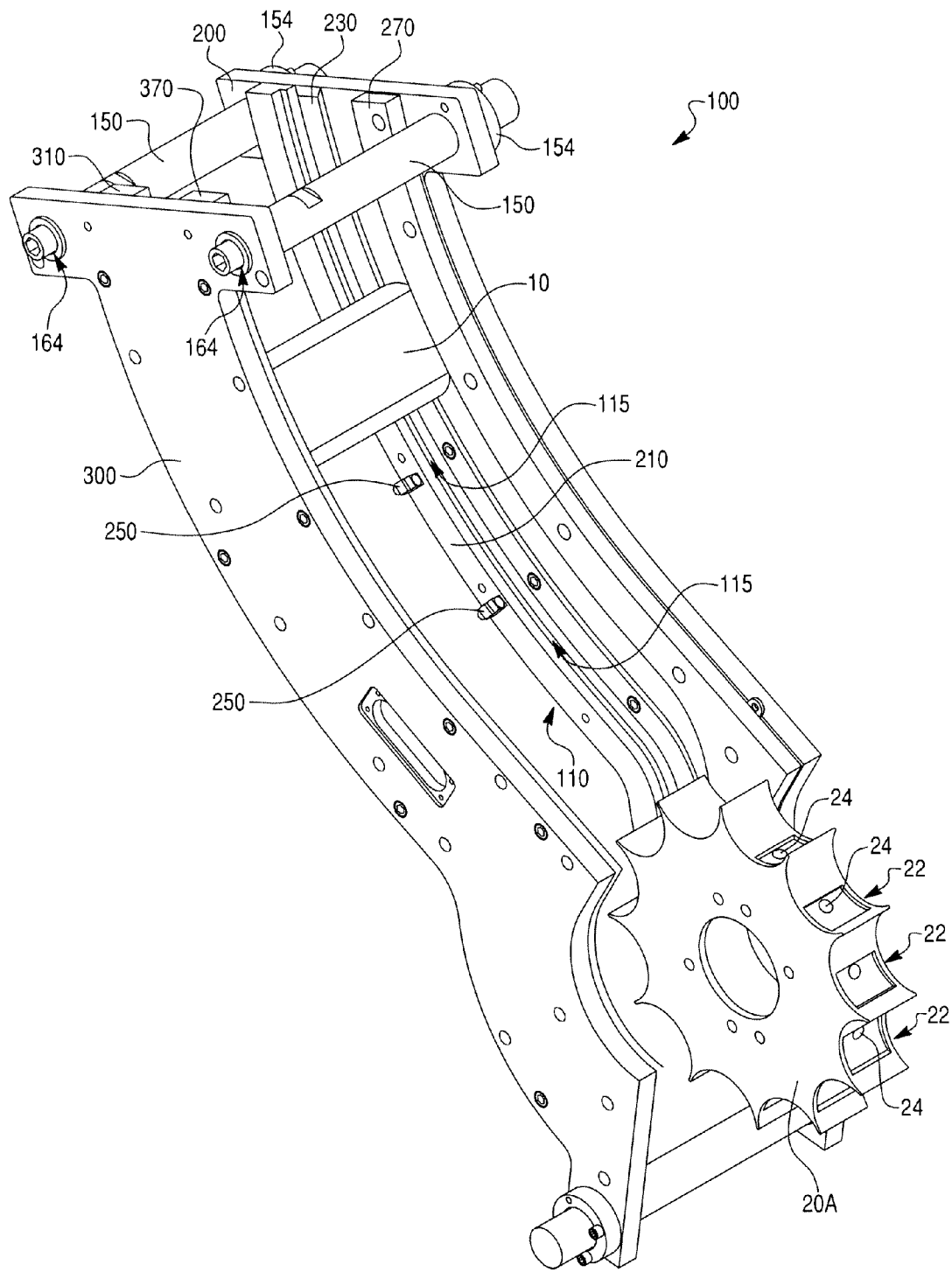
FIG. 3 is a front perspective view of the lubrication mechanism and infeed track and adjacent transfer star wheel.
Figure 8:
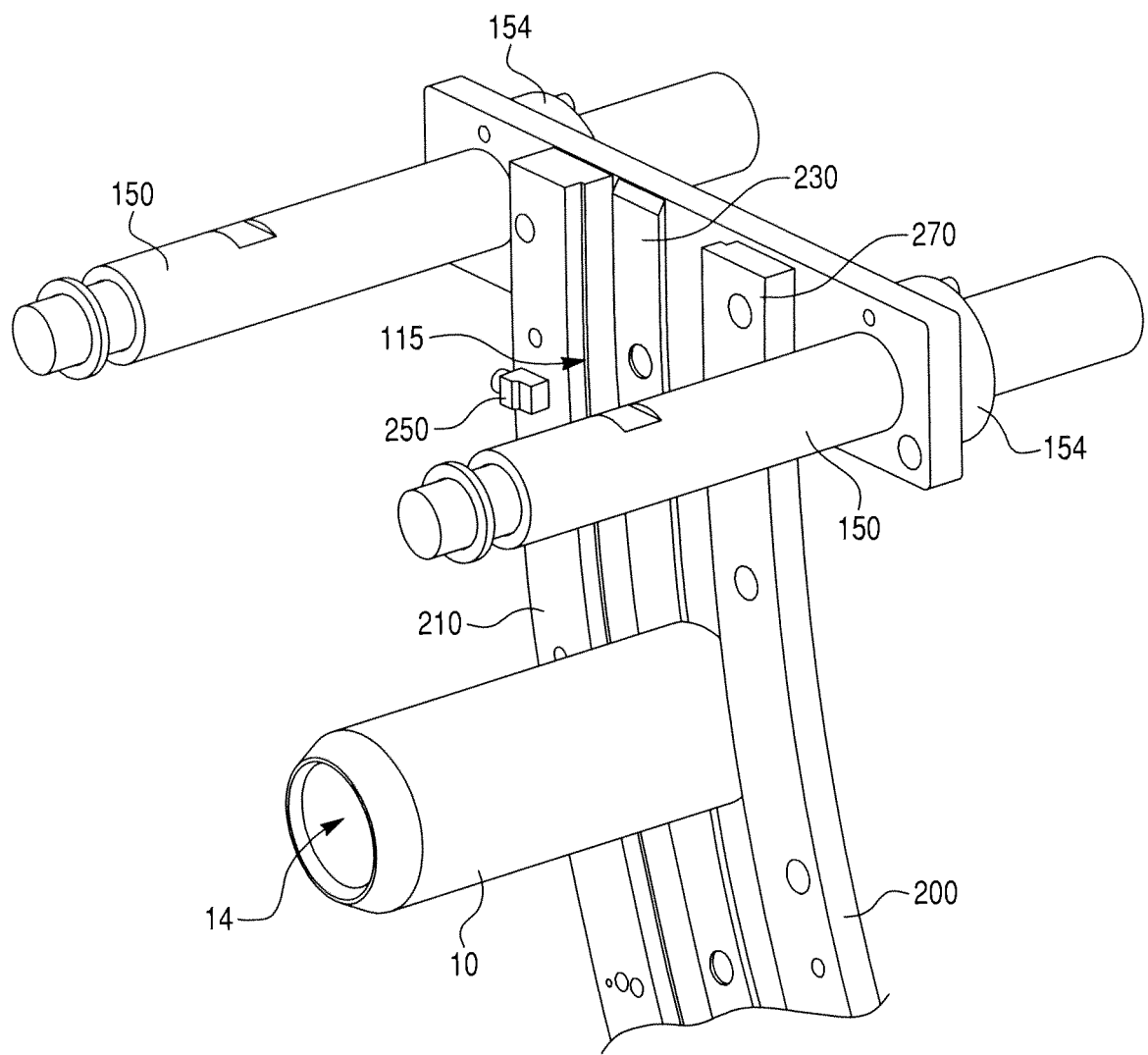
FIG. 8 is a partial perspective view of a guide mounting plate illustrating a can in the infeed track.

As best shown in FIGS. 1, 3, and 8, the lubricating mechanism 100 can be quickly reconfigured to accommodate a different size can 10. In order to quickly reconfigure the lubricating mechanism 100, the disclosed embodiments of these structures are such that the lubricating mechanism 100 is formed in two halves (first 200 and second 300 frame members) so that at least one half can be moved relative to the other. The first 200 and second 300 frame members are mutually supported on one another by way of three shafts: two upper frame shafts (rods) 150 and one lower frame shaft (rod) 160.

As will be appreciated from the FIGURES showing these embodiments, one end of each of the shafts 150, 160 is connected at a fixed end 164 to one of the first 200 or second 300 frame members while the other end is configured to slide through a collar 154 which is fastened to the other of the first 200 or second 300 frame member. The collars comprise split collars 154 having one portion fastened to a housing/structural member of the frame members 200, 300. By releasing the collars 154, the frame members 200, 300 can be slid along the shafts 150, 160 until the separation distance is suitable for the length of the can 10 which is to be fed into the lubrication mechanism 100. Simply retightening the split collars 154 locks the first 200 and second 300 frame members in a suitable condition for feeding the cans 10 into the lubricating mechanism 100.

The lubricating mechanism 100 can also be adjust to accommodate cans 10 of different diameter. Portions of the track 110 can be swapped out to be replaced with appropriately sized track components. For example, the inner 270 and outer 210 guide members, guide/wear plate 230, and outer 310 and inner 370 rails can be changed if cans 10 with a different diameter are to be used in the machine apparatus or machine line. The thermal insulator 240 and/or spacers 276, 312, 372 may also be replaced with a different sized insulator or spacers to adjust for different can 10 heights.

Figure 9:
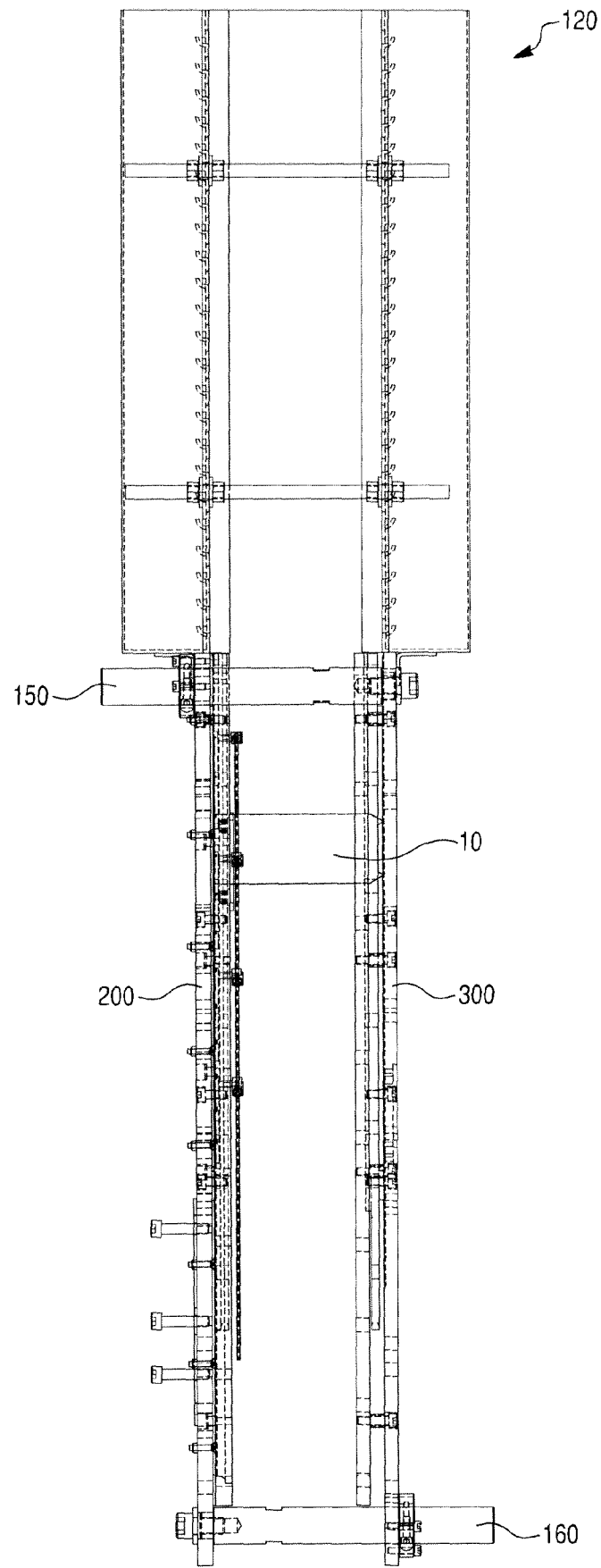
FIG. 9 is a side view of a lubrication mechanism according to an exemplary embodiment in which a can infeed is attached.

The lubricating mechanism 100 may be connected to a can infeed 120. The can infeed 120 is configured to supply the cans 10 into the track 110 for lubrication to be applied. FIG. 9 illustrates one exemplary embodiment of a can infeed 120.

According to another embodiment of the invention as shown in FIGS. 11-19, cans 10 are lubricated while being held in pockets 22 of a star wheel. The cans 10 to be lubricated are held in separate pockets 22 of the star wheel. The star wheel may be an infeed star wheel 20A, or any other star wheel 20 in a machine line 102. The lubricating mechanism 400 includes a lubricating track 414 coupled to or adjacent the star wheel 20.

Figure 14:
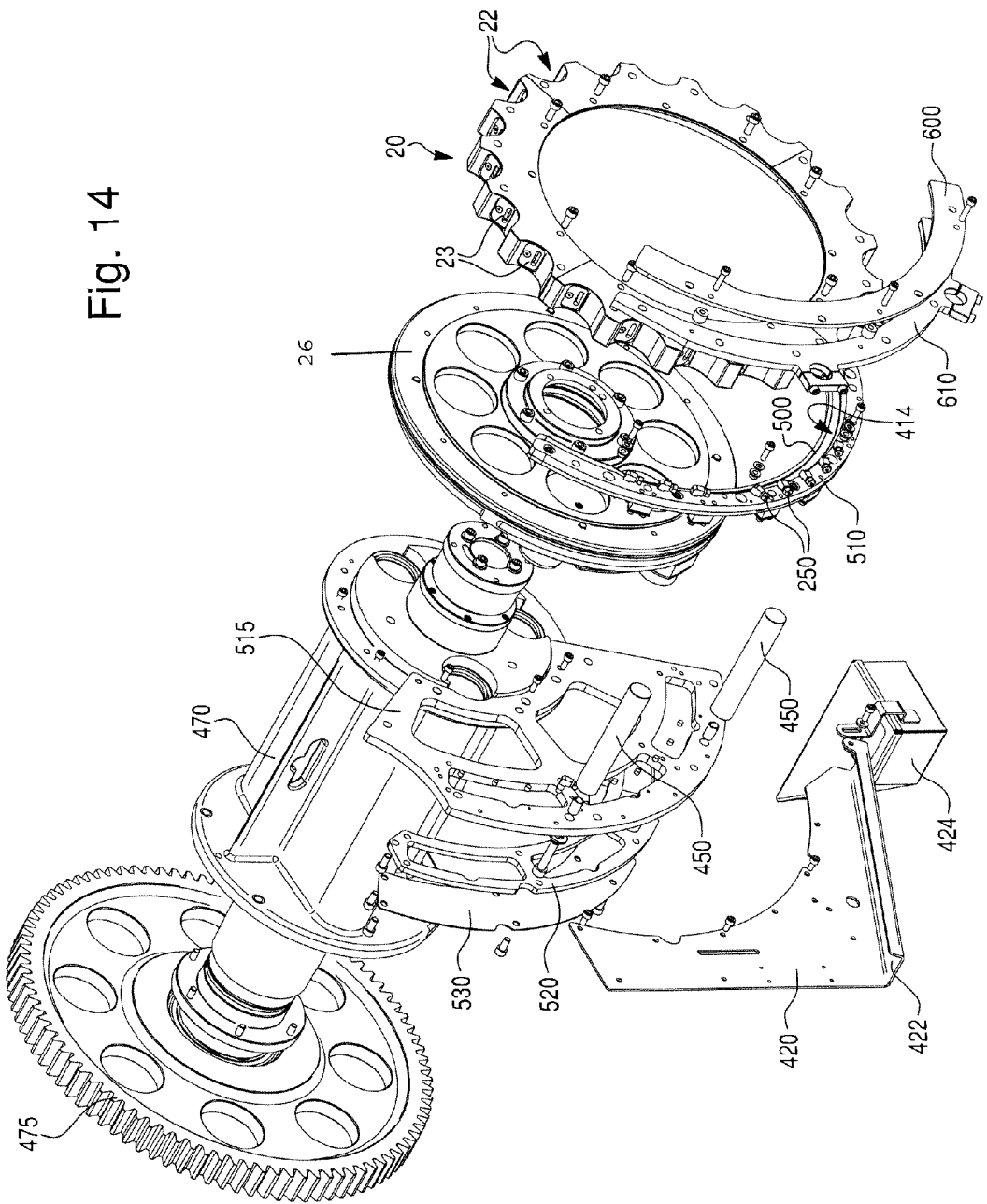
FIG. 14 is an exploded view of the star wheel lubrication mechanism of FIG. 11.
Figure 15:
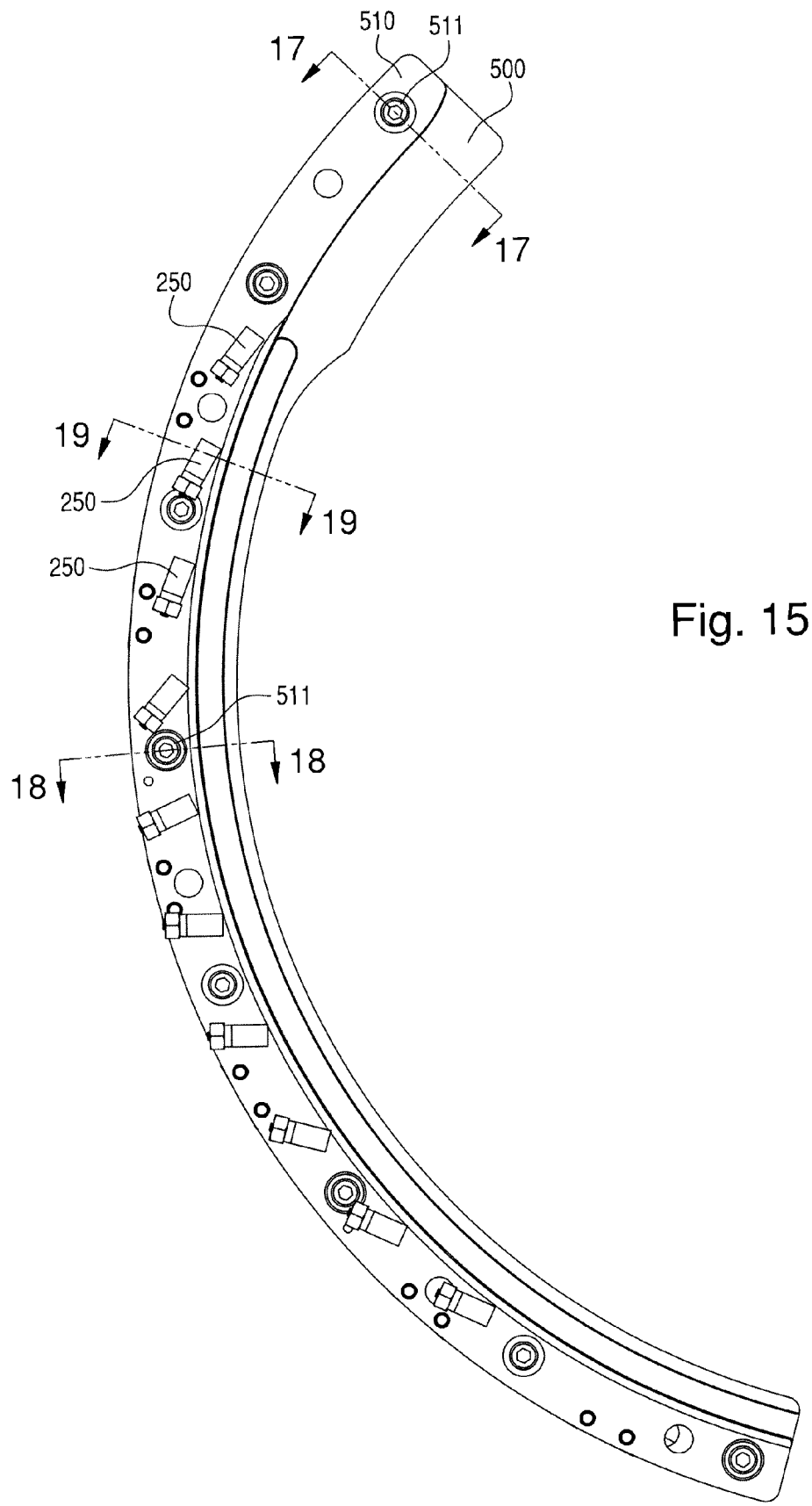
FIG. 15 is a left side view of a guide member and frame member of a star wheel lubrication mechanism of an exemplary embodiment.

The lubricating mechanism 400 includes a first frame member (first guide plate) 500 and a second frame member (second guide plate) 600. A first (or outer) guide member (or rail) 510 is attached to the first frame member 500 by screws 511 (FIGS. 15 and 17) or any other suitable mechanism. The first frame member 500 may further be attached to a mounting plate 515, a spacer 520 and heater cover 530, such as shown in FIG. 14.

Figure 11:
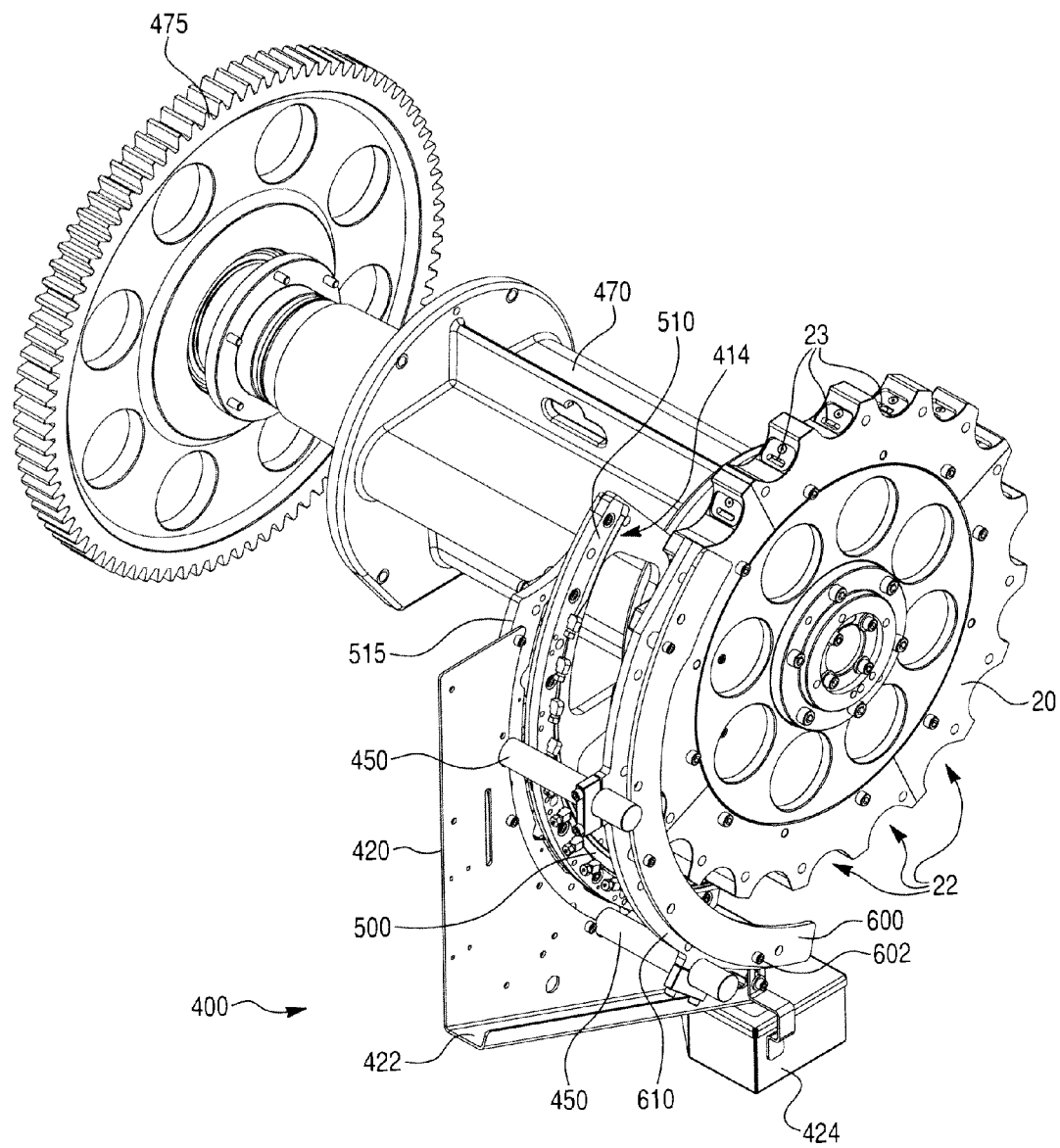
FIG. 11 is a perspective view of a star wheel lubrication mechanism according to another embodiment.

The second frame member 600 is attached to a second guide member (or rail) 610 via screws 602, or by any other suitable mechanism. The first frame member 500 is attached or coupled to the second frame member 600 by one or more mounting rods 450, such as shown in FIG. 11.

Figure 19:
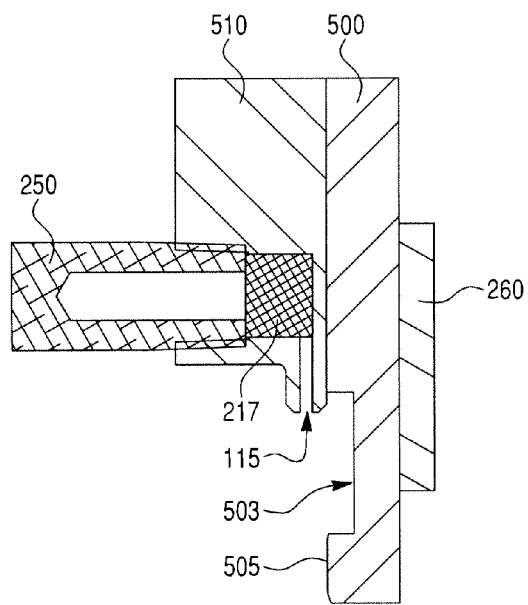
FIG. 19 is a detail view of the guide member and frame member of FIG. 15 taken along line 19-19.
Figure 20A:
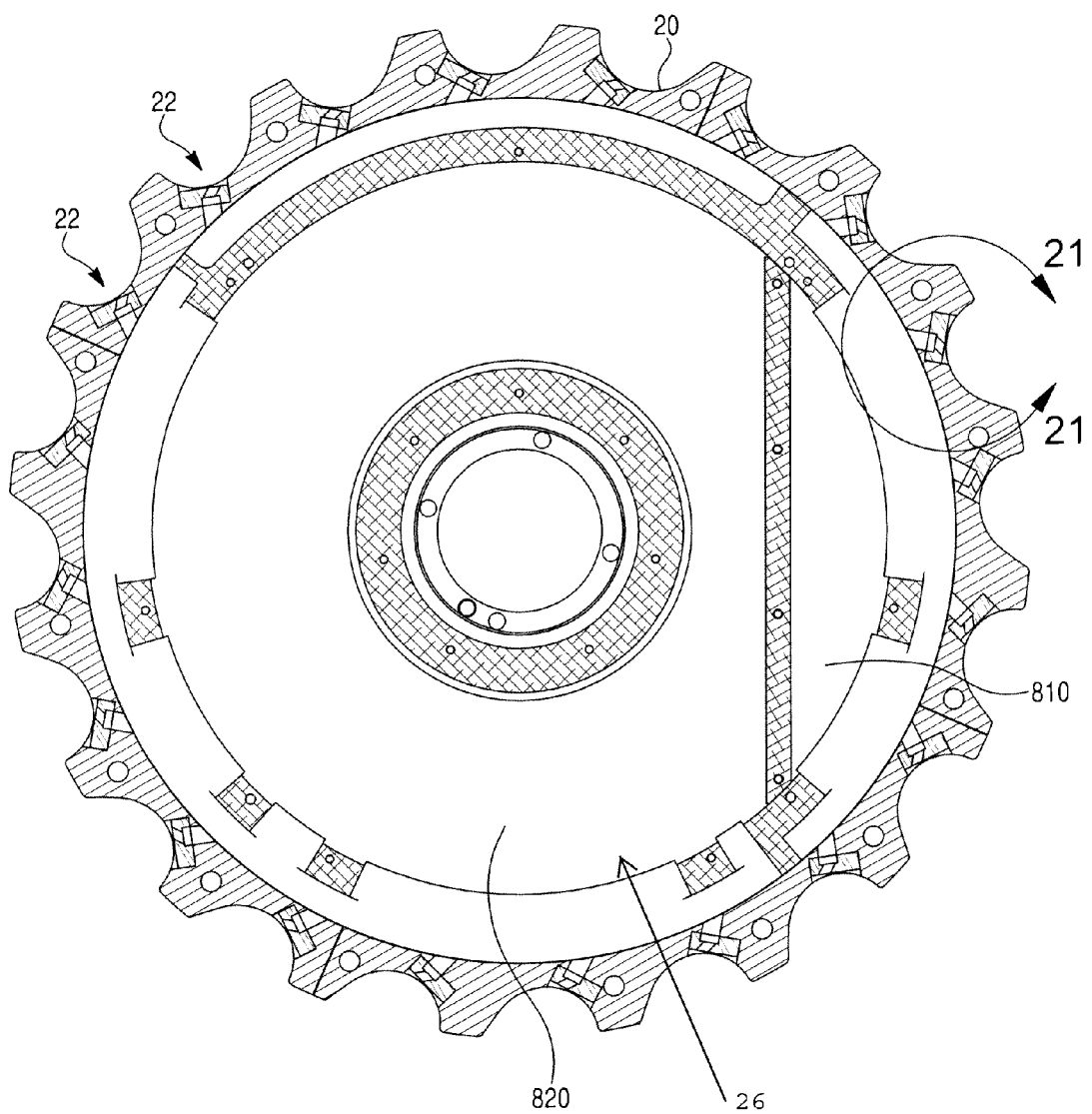
FIG. 20A is a sectional view of a star wheel taken along line 20A-20A in FIG. 13 that illustrates a vacuum chamber and a pressure chamber.
Figure 20B:
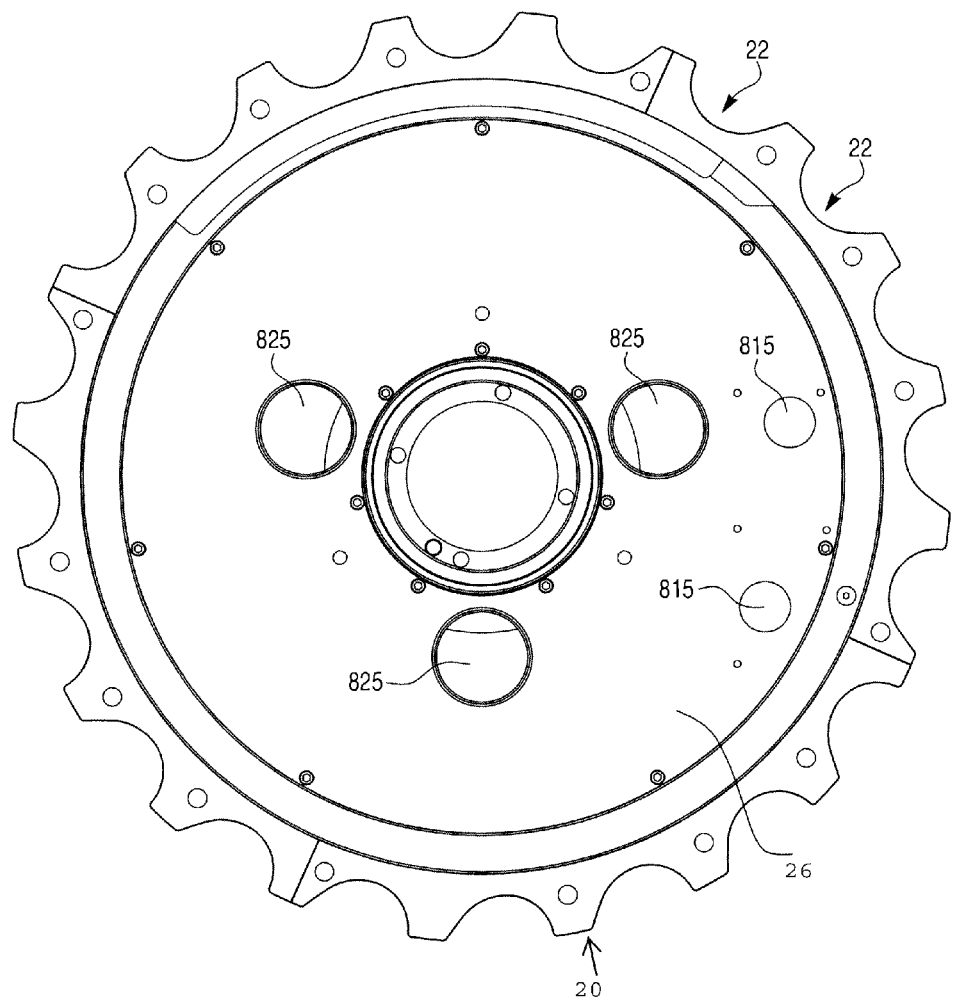
FIG. 20B is a sectional view of the star wheel of FIG. 20A illustrating vacuum ports and pressure ports.

The cans 10 to be lubricated are restrained radially between pockets 22 of the star wheel 20 and the first and second guide members 510, 610. The first guide member 510 supplies lubricant to the lubrication track 414 and the cans 10 via fittings 250 connected to the first guide member 510. A tube or hose 255 (FIG. 1) connects a lubricant supply to the fittings 250. The lubricant flows through the fittings 250, into a lubricant passage 115 and out onto a surface of the first guide member 510. The lubrication mechanism 400 may include a wick 217 between the fitting 250 and passage 115, such as shown in FIG. 19. The wick 217 may be made of felt or other suitable material.

Figure 12:
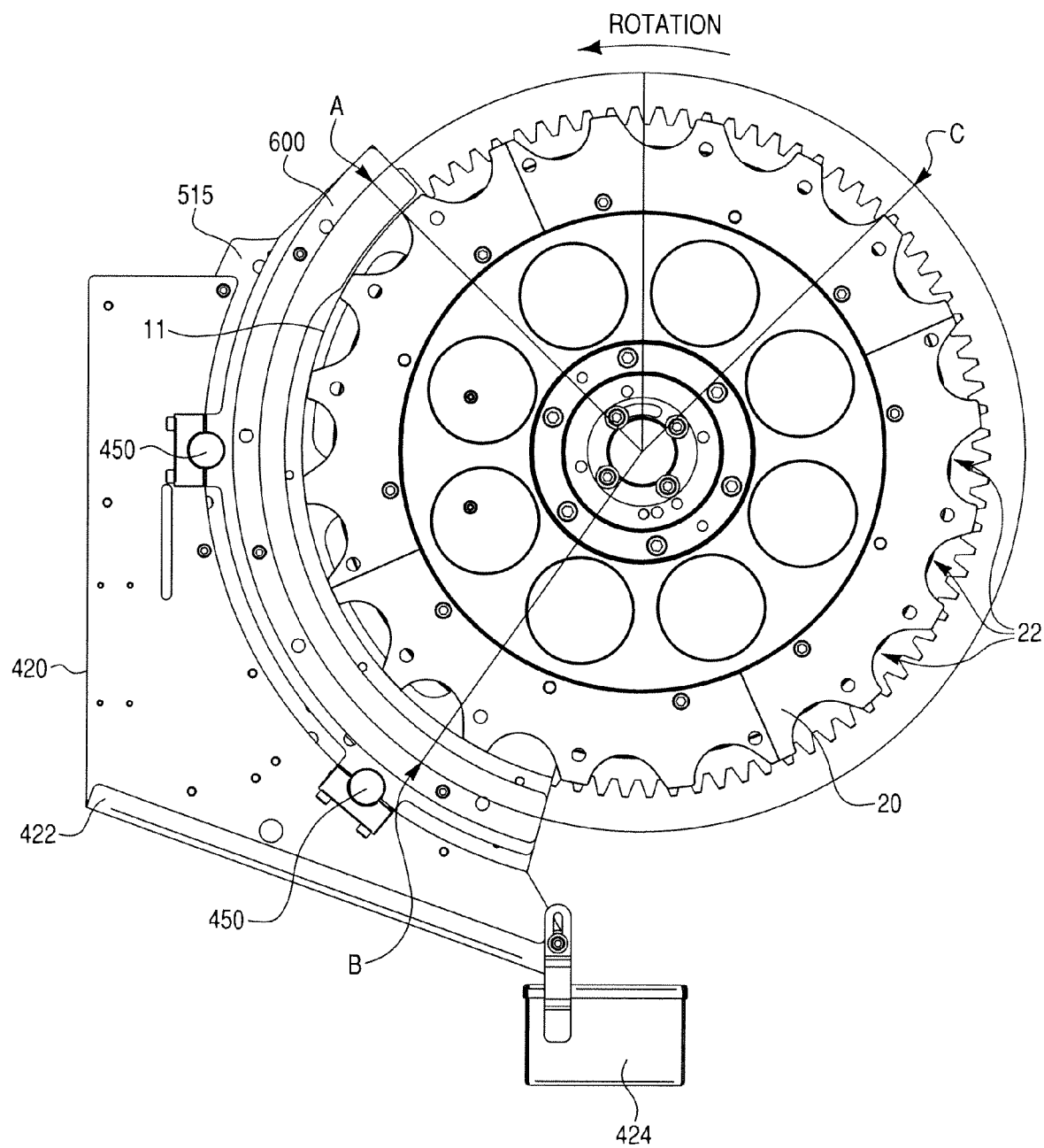
FIG. 12 is a front view of the star wheel lubrication mechanism of FIG. 11.

The cans 10 are restrained axially between the first and second frame members 500, 600 on each end. To encourage rotation of the cans 10 in the pockets 22, the first and second frame members 500, 600 contact the can 10 at a location or radius that is greater than the centerline 11 of the path of the can 10. For example, FIG. 12 illustrates the centerline 11 path of the cans 10. The frame members 500, 600 will contact the can 10 in the track 110 at a point outside of the curve line 11 representing the centerline of the can's 10 path. The first frame member 500 includes a groove 503 near the opening of the lubricant passage 115 for carrying away excess lubricant. A guide contact surface 505 is arranged adjacent to the groove 503 and is configured to contact a surface of the can 10 being lubricated.

The first guide member 510 has openings at the lubricant passage 115 through which the lubricant is deposited on the open end of the can 10. The shape of the first and second guide members 510, 610 and the corresponding frame members 500, 600 are intended to direct excess lubricant away. A lubrication bracket 420 is attached to the mounting plate 515 by screws or other suitable mechanism. An overflow trough 422, integrated into bracket 420, directs excess lubricant to overflow container 424, which is also attached to bracket 420. Excess lubricant that exits the lubrication track 414 falls onto the overflow trough 422, which is angled to direct the excess lubricant into the overflow container 424. Excess lubricant will either flow to the end of the first guide member 510 and into the overflow container 424, or flow over the edges or through grooves 503 provided in the first frame member 500 and down to the overflow trough 422 and into the overflow container 424.

Figure 21:
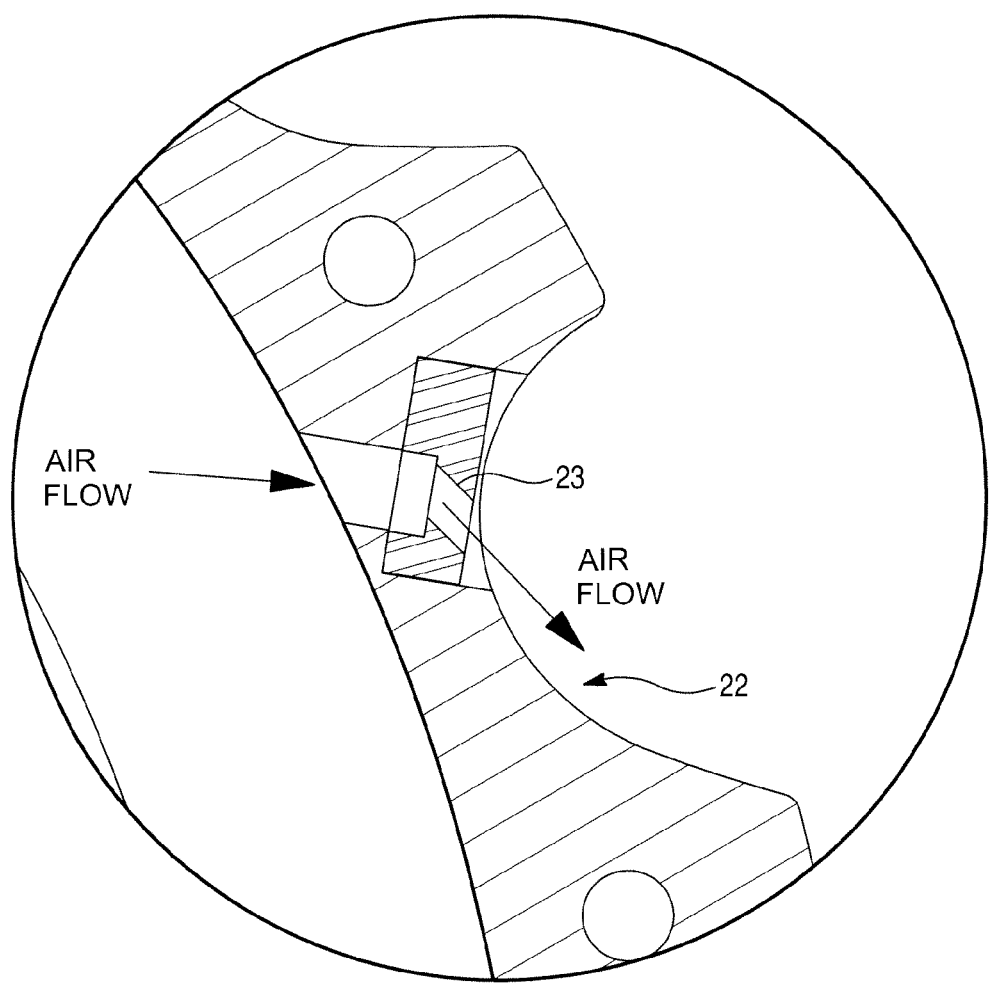
FIG. 21 is a detail view taken along detail 21 from FIG. 20A illustrating an air passage in a pocket of the star wheel.

When a can 10 passes through the lubrication mechanism 400, the can 10 will rotate in its respective pocket 22 and on the first and second guide members 510, 610, which allows the lubricant to be deposited around the diameter of the can 10. The lubrication mechanism 400 utilizes friction to cause the cans 10 to rotate. The friction may be low and so an additional rotation inducing mechanism may be used. For example, a jet of air may be provided to enhance rotation of the can 10 in the pocket 22. The jet of air may be supplied to the pockets 22 of the star wheel 20 through air openings or passages 23 (FIGS. 11 and 21) when the pockets 22 (and respective cans 10) are adjacent to the lubrication mechanism 400. The openings 23 may be angled to direct the air flow to further encourage rotation of the can 10. The jet of air may be switched on and off or switched from air pressure to a vacuum to control the cans 10 as necessary by means of a valve apparatus.

Positive air pressure or negative pressure (vacuum) is supplied to the pockets 22 of the star wheel 20 through the openings 23 via two chambers (810, 820) in the star wheel hub assembly 26 located inside the star wheel 20. One or more pressure ports 815 are connected to the pressure chamber 810 to provide air pressure. One or more vacuum ports 825 are connected to the vacuum chamber 820 to provide a vacuum. Air is blown into the pockets 22 via the openings 23 to encourage the cans 10 in the pockets 22 to rotate within the confines of the star wheel pocket 22 and first and second guide members 510, 610. A vacuum is supplied after the lubrication is complete to hold the can 10 in the pocket 22 for the purpose of transportation.

As shown in FIG. 12, a blower pressure is applied to the cans 10 in the pockets starting at point A. The air pressure is continued in the pockets 22 while the star wheel 20 rotates until a pocket 22 reaches point B. At point B, a vacuum is applied to the pocket 22 to facilitate can 10 transport in the star wheel 20. The vacuum is continued until the can 10 and pocket 22 reach point C. At point C, the vacuum is turned off so that the can 10 may be transferred to an adjacent turret or star wheel.

Figure 16:
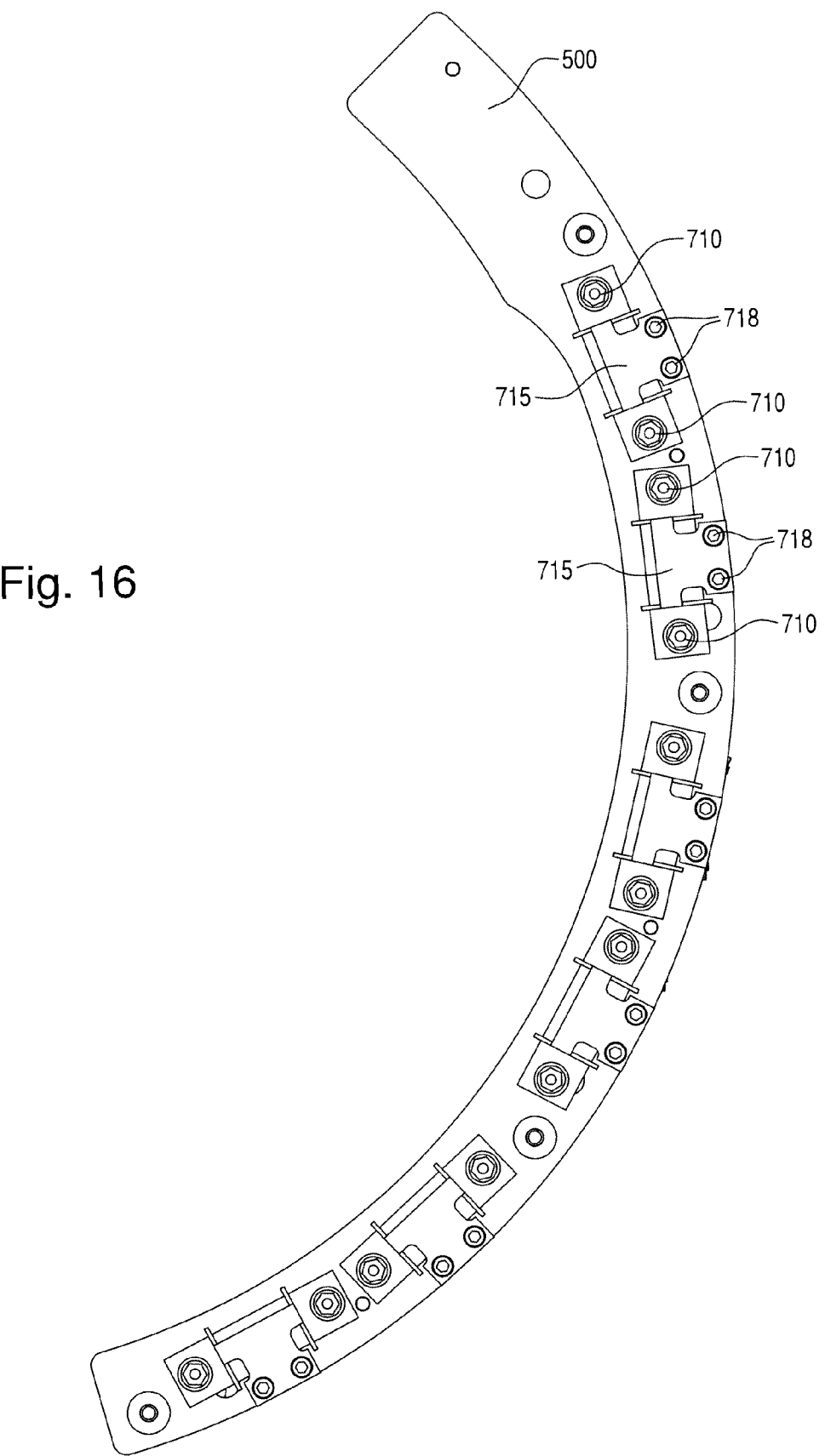
FIG. 16 is a right side view of the guide member and frame member of FIG. 15.
Figure 17:
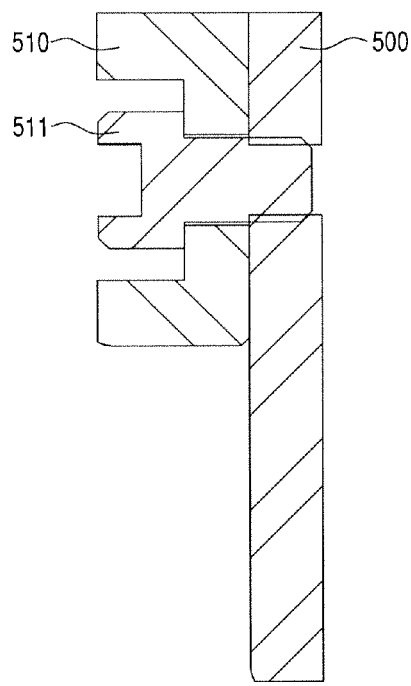
FIG. 17 is a detail view of the guide member and frame member of FIG. 15 taken along line 17-17.
Figure 18:
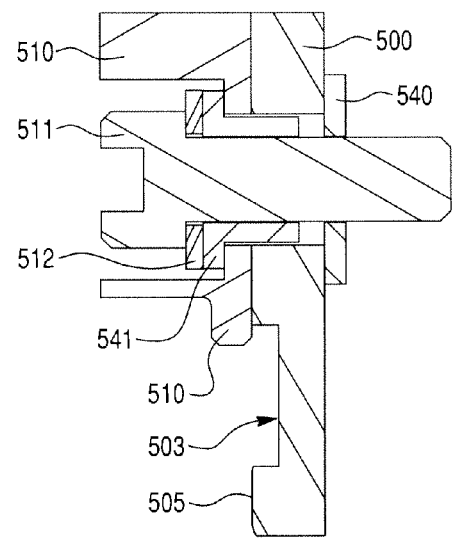
FIG. 18 is a detail view of the guide member and frame member of FIG. 15 taken along line 18-18.

As can be seen in FIGS. 16 and 19, the first frame member 500 may include one or more heaters 710. The heaters 710 are attached to the first frame member 500 via a heater clamp 715 and screws 718. In the exemplary embodiment, a heater clamp 715 holds or clamps two heaters 710 to the first frame member 500.

The first frame member 500 may further include one or more thermal insulators 540, 541. In the exemplary embodiment shown in FIGS. 16 and 18, a thermal insulator 540 is attached to a rear surface of the first frame member 500. A second thermal insulator 541 is attached to the front surface of the first frame member 500. The thermal insulators 540, 541 are attached to the first frame member 500 via a screw 511 and washer 512, or any other suitable mechanism.

Figure 13:
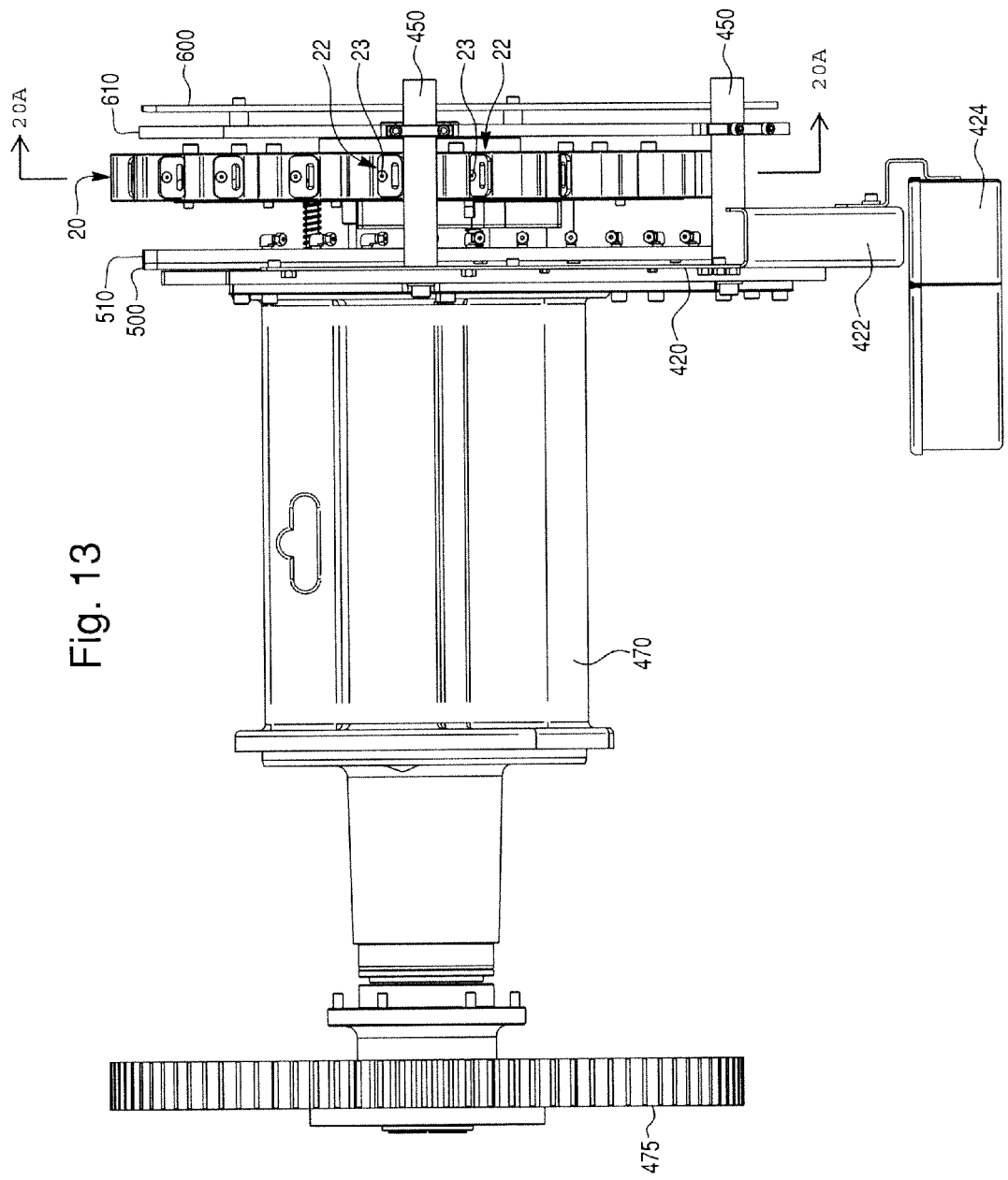
FIG. 13 is a side view of the star wheel lubrication mechanism of FIG. 11.

As shown in FIGS. 11, 13, and 14, the star wheel 20 is connected to a transfer drive gear 475 via a transfer housing 470. The star wheel 20 is driven via the transfer drive gear 475.

The guide members 210, 270, 510, 610, and other components such as the guide/wear plate 230, may comprise a hard, slow-wearing surface that will not require frequent replacement. For example, chrome plated steel may be used or any other suitable material.

It will be recognized that the lubricating mechanism may reduce the complexity and cost compared to a vacuum star wheel equipped with lubricating rollers. The lubricating mechanism also eliminates the need to replace a wick due to debris build up.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," "attached," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the lubrication mechanism as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A lubricating mechanism for a machine arrangement, comprising:
    a lubricating track connected to or part of an infeed mechanism configured to supply articles to be processed to the machine arrangement, wherein the lubricating track includes:
        an outer guide member configured to contact articles adjacent open ends of the articles, the outer guide member comprising a lubricant passage or chamber; and
        at least one opening in the outer guide member for passage of lubricant from the outer guide member to a lubrication path configured to be in contact with the articles in the lubricating track to apply the lubricant to the articles, and
    a starwheel with at least one pocket to hold one of the articles and at least one air passage to provide air flow to the at least one pocket to rotate the one of the articles in the at least one pocket, the starwheel being coupled to or adjacent the lubricating track such that the one of the articles located in the at least one pocket of the starwheel receives the lubricant from the lubricating track, wherein the lubricating mechanism is configured so that the articles rotate within the at least one pocket and on the outer guide member while the lubricant is being applied.

2. The lubricating mechanism of claim 1, further comprising a wick positioned in the lubricant chamber or between the lubrication path and fittings of the outer guide member configured to supply the lubricant to the outer guide member.

3. The lubricating mechanism of claim 2, wherein the wick is positioned in the lubricant chamber or between the lubricant path and fittings such that the articles do not directly contact the wick.

4. The lubricating mechanism of claim 1, wherein the lubricating track includes first and second frame members, and wherein the articles are configured to extend between the first and second frame members.

5. The lubricating mechanism of claim 4, wherein the the outer guide member and an inner guide member are attached to the first frame member such that a distance between the inner and outer guide members fits a diameter of the articles in the mechanism.

6. The lubricating mechanism of claim 5, wherein the first frame member includes a guide/wear plate positioned between the inner and outer guide members such that a portion of a first end of each of the articles is adjacent the guide/wear plate.

7. The lubricating mechanism of claim 6, wherein the guide/wear plate is configured such that a smaller clearance is provided between the portion of the first end of each of the articles; and wherein a larger clearance is provided between a remaining portion of the first end of each of the articles and the first frame member.

8. The lubricating mechanism of claim 5, wherein the inner guide member includes an inner profile surface configured to be adjacent to and/or contact each of the articles in the lubricating track, and wherein the inner profile surface includes a portion configured to avoid contact with the lubricant applied to the articles.

9. The lubricating mechanism of claim 5, further comprising at least one fitting connected to the outer guide member, the at least one fitting configured to supply the lubricant from a lubricant source to the lubricant chamber.

10. The lubricating mechanism of claim 5, wherein the outer guide member includes a heater configured to heat the lubricant in the lubricant chamber or passage.

11. The lubricating mechanism of claim 10, further comprising a thermal insulator positioned between the first frame member and the outer guide member, the thermal insulator configured to reduce heat transfer from a heated outer guide member to the first frame member.

12. The lubricating mechanism of claim 4, wherein the second frame member includes first and second guide rails configured such that a distance between the first and second guide rails fits a diameter of the articles in the mechanism.

13. The lubricating mechanism of claim 12, further comprising a first spacer positioned between the first guide rail and the second frame member, and a second spacer positioned between the second guide rail and the second frame member.

14. The lubricating mechanism of claim 13, wherein the first and second spacers are of different thicknesses such that the first guide rail is spaced apart from the second frame member at a distance different from a distance separating the second guide rail from the second frame member.

15. The lubricating mechanism of claim 4, wherein the first and second frame members are adjustable relative to each other to accommodate articles of different height.

16. The lubricating mechanism of claim 15, further comprising frame shafts connecting the first and second frame members, and wherein the first and/or second frame member is configured to move along a length of the frame shafts to change a distance separating the first and second frame members.

17. The lubricating mechanism of claim 1, wherein the infeed mechanism is configured to supply the articles to be processed in the machine arrangement, and wherein the lubricating track is curved so that the articles roll through the lubricating track as the lubricant is being applied.

18. The lubricating mechanism of claim 1, wherein the starwheel comprises a plurality of pockets to hold the articles, and wherein the articles to be lubricated are located in separate pockets of the starwheel.

19. The lubricating mechanism of claim 18, wherein the articles rotate within their respective pockets and on the outer guide member when passing through the lubricating track.

20. The lubricating mechanism of claim 1, wherein the at least one pocket receives positive air pressure or vacuum depending on a current angular position of the starwheel and the at least one pocket.

21. The lubricating mechanism of claim 20, wherein the positive air pressure is supplied to the at least one pocket when the at least one pocket is adjacent the lubricating track, and wherein the vacuum pressure is supplied to the at least one pocket when the at least one pocket is positioned away from the lubricating track.

22. A machine arrangement with a lubricating mechanism, comprising:
    an article infeed mechanism with a lubricating track, the article infeed mechanism configured to supply articles to be processed to machines in the machine arrangement, wherein the lubricating track includes:
        inner and outer guide members configured such that an open end of each of the articles in the lubricating track are positioned between the inner and outer guide members; and
        a lubrication path on the outer guide member extending for at least a portion of a length of the lubricating track, and
    a starwheel with at least one pocket to hold one of the articles and at least one air passage to provide air flow to the at least one pocket to rotate the one of the articles in the at least one pocket, the starwheel being coupled to or adjacent the lubricating track such that the one of the articles located in the at least one pocket of the starwheel receives the lubrication from the lubricating track,
    wherein the articles contact lubricant in the lubrication path when rolling through the track within the at least one pocket and on the outer guide member without contacting a wick.

23. The machine arrangement of claim 22, further comprising a transfer starwheel coupled to the article infeed mechanism and configured such that articles exiting the article infeed mechanism move into corresponding pockets in the transfer starwheel.

24. A method of lubricating an article in a machine arrangement, comprising:
    providing a lubricating track;
    applying a lubricant to a lubrication path on the lubricating track from a lubricant chamber or passage,
    holding at least one article in the at least one pocket of a starwheel, the starwheel comprising at least one air passage; and
    rotating the at least one article within the at least one pocket and on an outer guide member along the lubricating track or within a lubrication mechanism and the at least one pocket of the starwheel so that the lubricant transfers to an open end of each of the at least one article as the at least one article contacts the lubrication path on the lubricating track, wherein the rotating includes providing an air flow through the at least one air passage of the starwheel to the at least one pocket to rotate the article in the at least one pocket.

25. The method of claim 24, wherein the lubricant chamber or passage includes a wick, and wherein the at least one article does not directly contact the wick.

26. The method of claim 24, further comprising heating the lubricant in the lubricant chamber.

* * * * *